United States Patent
Barthel et al.

(10) Patent No.: US 6,348,557 B1
(45) Date of Patent: Feb. 19, 2002

(54) CROSSLINKABLE ORGANOPOLYSILOXANE MATERIALS

(75) Inventors: Herbert Barthel, Emmerting (DE); August Altenbuchner, Radegund (AT); Johann Schuster, Emmerting (DE); Mario Heinemann, Burghausen (DE); Lutz Eismann, Emmerting (DE); Otto Rothenaicher, Zeilarn (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/214,042

(22) PCT Filed: Jun. 19, 1997

(86) PCT No.: PCT/EP97/03197

§ 371 Date: Dec. 23, 1998

§ 102(e) Date: Dec. 23, 1998

(87) PCT Pub. No.: WO97/49767

PCT Pub. Date: Dec. 31, 1997

(30) Foreign Application Priority Data

Jun. 26, 1996 (DE) .......................... 196 25 654

(51) Int. Cl.⁷ ................................. C08G 77/04
(52) U.S. Cl. .................. 528/34; 528/15; 528/31; 528/32; 524/730; 524/731
(58) Field of Search .............. 528/15, 31, 32, 528/34; 524/730, 731

(56) References Cited

U.S. PATENT DOCUMENTS

| | | | |
|---|---|---|---|
| 3,933,729 A | 1/1976 | Letoffé | |
| 4,988,758 A | * 1/1991 | Fukuda et al. | ............... 524/492 |
| 5,057,151 A | 10/1991 | Schuster et al. | |
| 5,268,441 A | 12/1993 | Barthel et al. | |
| 5,300,612 A | * 4/1994 | Saruyama | ..................... 528/17 |
| 5,548,053 A | 8/1996 | Weidner et al. | |
| 5,591,797 A | 1/1997 | Barthel et al. | |
| 5,610,218 A | 3/1997 | Funk et al. | |
| 5,977,243 A | * 11/1999 | Barthel et al. | ............... 524/588 |

FOREIGN PATENT DOCUMENTS

| | | | |
|---|---|---|---|
| DE | 24 22 846 | | 4/1976 |
| DE | 38 39 900 | | 5/1990 |
| DE | 41 39 148 | | 6/1993 |
| DE | 42 16 139 | | 11/1993 |
| DE | 43 36 345 | | 4/1995 |
| DE | 44 01 606 | | 7/1995 |
| DE | 44 05 245 | | 8/1995 |
| DE | 195 45 363 | | 6/1997 |
| EP | 0 217 333 | | 9/1986 |
| JP | 1203467 | * | 8/1989 |
| WO | 93/17654 | * | 9/1993 |

OTHER PUBLICATIONS

Von D. Hoebbel et al., "Gaschromatographische und ²⁹Si–NMR–spektroskopische Untersuchungen an Kieselsäuretrimethylsilylestern", Z. anorg. allg. Che. 424, 115–127 (1976).

* cited by examiner

Primary Examiner—Margaret G. Moore
(74) Attorney, Agent, or Firm—Brooks & Kushman P.C.

(57) ABSTRACT

The invention relates to crosslinkable materials based on organopolysiloxanes. Said materials are characterized in that in addition to organopolysiloxanes they contain at least one low-molecular organosilicon compound with 2 to 17 silicon atoms comprising units of the formula (I) $R^1_a R^2_b (OR^3)_c SiO_{4-(a+b+c)/2}$, $R^1$, $R^2$, $R^3$, a, b and c having the meaning given in claim 1 provided that low-molecular organosilicon compounds comprising units of the formula (I) where b is 0 have at least one unit of the formula (I) in which a is 0 or 1, and at least one unit of the formula (I) in which a is 3.

4 Claims, No Drawings

CROSSLINKABLE ORGANOPOLYSILOXANE MATERIALS

The invention relates to crosslinkable organopolysiloxane compositions which are prepared with addition of low molecular weight organosilicon compounds.

For the purposes of the present invention, the term organopolysiloxanes encompasses dimeric, oligomeric and polymeric siloxanes.

DE-B 24 22 846 (Rhone-Poulenc S.A.; issued on Apr. 23, 1976) and the corresponding U.S. Pat. No. 3,933,729 and U.S. Pat. No. 3,983,265 describe condensation-crosslinkable organopolysiloxane compositions which, to improve adhesion, contain from 10 to 50 parts of MQ resin having a ratio of triorganosiloxy units (M units) to $SiO_{4/2}$ units (Q units) of less than or equal to 1.2.

EP-A 217 333 (Dow Corning Corp.; issued on Oct. 18, 1989) discloses a process for preparing condensation-crosslinking RTV-1 compositions based on hydroxyl-terminated poly(trifluoropropyl)methylsiloxane, silica and 1,3-bis(3,3,3-trifluoropropyl)tetramethyldisilazane.

DE-A-42 16 139 (Wacker-Chemie GmbH; issued on Nov. 18, 1993) and the corresponding US application having the serial number U.S. Ser. No. 08/313,192 describes MQ resins having a ratio of M units to Q units of less than or equal to 1. Powders having a particle size of, for example, 1–100 μm can be prepared from these resins. The molecular weight is, in particular, from 500 to 10,000 g/mol.

The German application number 195 45 363.8 (Wacker-Chemie GmbH; filed on Dec. 5, 1995) describes the use of low molecular weight organosilicon compounds containing aliphatically unsaturated radicals in crosslinkable compositions based on organopolysiloxanes.

WO 93/17654 describes addition-crosslinking dental compositions and the addition of resins comprising M and Q constituents and having a molecular weight of 100–100,000. EP-A-0 291 871 describes the preparation of H-siloxanes having 3–5 Si atoms and their use as building blocks in chemical synthesis (hydrosilylation) and in organopolysiloxanes as coupling agent. DE-A-26 09 681 describes the preparation of low molecular weight SiOH-siloxanes and their later use, with the silanol content of the low molecular weight siloxanes being 6.5<OH<14% by weight. JP-A-01203467 describes the use of siloxanes comprising D units as additives in peroxidically crosslinking HTV rubber. DE-A-41 14 554 describes the preparation of H-siloxanes having 3–1000 Si atoms and their use as coupling agents in silicone rubber. EP-A-0 693 533 and EP-A-0 575 863 each describe condensation-crosslinking compositions. U.S. Pat. No. 3,361,714 describes peroxidically crosslinking HTV compositions and the use of compounds of the type $M_aD_bT_c$. EP-A-0 651 021 describes addition-crosslinking compositions and the use of MQ resin with M:Q of from 1:1 to 2:1 and comprising M and Q units; according to page 4, lines 51–55 small amounts of low molecular weight MQ resins can be present as a result of the method of preparation. EP-A-0 628 617 describes high temperature condensation-crosslinking compositions and describes the use of solid MQ compounds with M:Q of from 0.5:1 to 1.2:1 and comprising M and Q units.

The invention provides crosslinkable, organopolysiloxane-based compositions which comprise, in addition to organopolysiloxanes, at least one low molecular weight organosilicon compound having from 2 to 17 silicon atoms and comprising units of the formula $$R^1_a R^2_b (OR^3)_c SiO_{4-(a+b+c)/2} \quad (I)$$

where
R$^1$ can be identical or different and are each a hydrogen atom or an aliphatically saturated, SiC-bonded hydrocarbon radical having from 1 to 18 carbon atoms, where at most one radical R$^1$ per silicon atom can be a hydrogen atom, R$^2$ can be identical or different and are each an aliphatically saturated, halogen-substituted SiC-bonded hydrocarbon radical having from 1 to 18 carbon atoms, R$^3$ can be identical or different and are each a hydrogen atom or an unsubstituted or halogen-substituted hydrocarbon radical having from 1 to 12 carbon atoms, which may be interrupted by oxygen atoms, a is 0, 1, 2 or 3,
b is 0, 1, 2 or 3,
c is 0, 1, 2 or 3 and
the sum of a, b and c in formula (I) is less than or equal to 3, with the proviso that low molecular weight organosilicon compounds comprising units of the formula (I) where b=0 contain at least one unit of the formula (I) in which a is 0 or 1 and at least one unit of the formula (I) in which a is 3.

The low molecular weight organosilicon compounds used according to the invention have a molecular weight of preferably from 150 to 2500 g/mol, particularly preferably from 150 to 1500 g/mol, in particular from 150 to 500 g/mol.

The low molecular weight organosilicon compounds used according to the invention preferably have a boiling point of greater than 200° C. at a pressure of from 900 to 1100 hPa.

Examples of aliphatically saturated hydrocarbon radicals R$^1$ are alkyl radicals such as the methyl radical, the ethyl radical, propyl radicals such as the iso- or n-propyl radical, butyl radicals such as the tert- or n-butyl radical, pentyl radicals such as neo-, iso- or n-pentyl radicals, hexyl radicals such as the n-hexyl radical, heptyl radicals such as the n-heptyl radical, octyl radicals such as the 2-ethylhexyl or n-octyl radical, decyl radicals such as the n-decyl radical, dodecyl radicals such as the n-dodecyl radical, hexadecyl radicals such as the n-hexadecyl radical and octadecyl radicals such as the n-octadecyl radical, aryl radicals such as the phenyl, biphenyl or naphthenyl radical, alkylaryl radicals such as benzyl, ethylphenyl, toluyl or xylyl radicals.

The radical R$^1$ is preferably an aliphatically saturated hydrocarbon radical having from 1 to 18 carbon atoms, particularly preferably a methyl radical, phenyl radical or octyl radical, in particular the methyl radical for reasons of availability.

Examples of radical R$^2$ are halogenated aliphatically saturated alkyl radicals such as the 3-chloropropyl, 3,3,3-trifluoro-n-propyl, 2,2,2,2',2',2'-hexafluoroisopropyl, heptafluoroisopropyl or perfluorohexylethyl radical, halogenated aryl radicals such as the o-, m-, p-chlorophenyl or o-, m-, p-chlorobenzyl radicals.

The radical R$^2$ is preferably a 3,3,3-trifluoropropyl radical or a perfluorohexylethyl radical, with particular preference being given to the 3,3,3-trifluoropropyl radical for reasons of availability.

Examples of hydrocarbon radicals R$^3$ are the radicals having from 1 to 12 carbon atoms indicated for R$^1$ and R$^2$ and also alkoxyalkyl radicals such as the methoxymethyl radical and the ethoxyethyl radical and alkenyl radicals such as the vinyl and allyl radicals.

The radical R$^3$ is preferably a hydrogen atom or a methyl or ethyl radical, with particular preference being given to a hydrogen atom.

The organosilicon compounds used according to the invention can be branched, linear or cyclic siloxanes, with the proviso that low molecular weight organosilicon compounds comprising units of the formula (I) where b=0 contain at least one unit of the formula (I) in which a is 0 or 1 and at least one unit of the formula (I) in which a is 3.

The low molecular weight organosilicon compounds used according to the invention are preferably compounds which consist of M units, i.e. units of the formula (I) where a+b=3, and also Q units, i.e. units of the formula (I) where a+b=0, and/or T units, i.e. units of the formula (I) where a+b=1, where the numerical ratio of M units to the sum of Q units and/or T units is greater than or equal to 1, preferably greater than or equal to 2, particularly preferably greater than or equal to 2.5, or compounds which consist of units of the formula (I) where a=b=1 and, if desired, units of the formula (I) where a=b=c=1.

The low molecular weight organosilicon compounds used according to the invention are particularly preferably compounds which consist of M units, i.e. units of the formula (I) where a+b=3, and Q units, i.e. units of the formula (I) where a+b=0, where the numerical ratio of M units to Q units is greater than or equal to 1, preferably greater than or equal to 2, particularly preferably greater than or equal to 2.5.

The low molecular weight organosilicon compounds used according to the invention preferably contain at least one unit of the formula (I) in which c is not 0.

The low molecular weight organosilicon compounds used according to the invention particularly preferably have from 3 to 9 silicon atoms.

Examples of low molecular weight organosilicon compounds used according to the invention are $[(CH_3)_3SiO]_4Si$, $[(CH_3)_3SiO]_3SiOH$, $[(CH_3)_3SiO]_2Si(OH)_2$, $\{[(CH_3)_3SiO]_3Si\}_2O$, $[(CH_3)_3SiO]_2Si(OH)OSi[(CH_3)_3SiO]_3$, $\{[(CH_3)_3SiO]_2Si(OH)\}_2O$, $\{[(CH_3)_3SiO]_2SiO\}_3$,

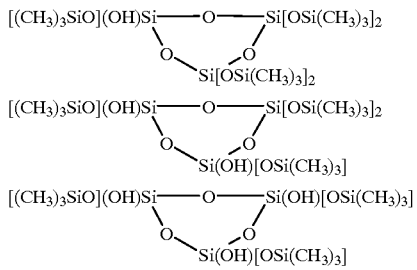

$[(CF_3CH_2CH_2)(CH_3)_2SiO][(CH_3)_3SiO]_3Si$, $[(CF_3CH_2CH_2)(CH_3)_2SiO]_2[(CH_3)_3SiO]_2Si$, $[(CF_3CH_2CH_2)(CH_3)_2SiO]_3[(CH_3)_3SiO]Si$, $[((CF_3CH_2CH_2)(CH_3)_2SiO]_4Si$, $[(CF_3CH_2CH_2)(CH_3)_2SiO][(CH_3)_3SiO]_2SiOH$, $[(CF_3CH_2CH_2)(CH_3)_2SiO]_2[(CH_3)_3SiO]SiOH$, $[(CF_3CH_2CH_2)(CH_3)_2SiO]_3SiOH$, $[[(CF_3CH_2CH_2)(CH_3)_2SiO]_3SiOSi[[(CF_3CH_2CH_2)(CH_3)_2SiO]_3$, $[(CF_3CH_2CH_2)(CH_3)_2SiO]_2[(CH_3)SiO]SiOSi[(CF_3CH_2CH_2)(CH_3)_2SiO]_3$ $[(CF_3CH_2CH_2)(CH_3)_2SiO][(CH_3)_3SiO]_2SiOSi[(CF_3CH_2CH_2)(CH_3)_2SiO]_3$ and isomers, $[(CH_3)_3SiO]_3SiOSi[(CF_3CH_2CH_2)(CH_3)_2SiO]_3$ and isomers, $[(CH_3)_3SiO]_3SiOSi[(CH_3)_3SiO][(CF_3CH_2CH_2)(CH_3)_2SiO]_2$ and isomers, $[(CF_3CH_2CH_2)(CH_3)_2SiO]_2Si(OH)OSi[(CF_3CH_2CH_2)(CH_3)_2SiO]_3$, $[(CF_3CH_2CH_2)(CH_3)_2SiO]_2Si(OH)OSi(OH)[(CF_3CH_2CH_2)(CH_3)_2SiO]_2$, $[(CF_3CH_2CH_2)(CH_3)_2SiO][(CH_3)_3SiO]Si(OH)OSi[(CF_3CH_2CH_2)(CH_3)_2SiO]_3$ and isomers, $[(CH_3)_3SiO]_2Si(OH)OSi[(CF_3CH_2CH_2)(CH_3)_2SiO]_3$ and isomers, $[(CH_3)_3SiO]_2Si(OH)OSi[(CH_3)_3SiO][(CF_3CH_2CH_2)(CH_3)_2SiO]_2$ and isomers, $[(CF_3CH_2CH_2)(CH_3)SiO]_{3-15}$ and mixtures thereof and also $HO—(CF_3CH_2CH_2)(CH_3)SiO]_{2-15}—H$ and mixtures thereof.

In particular, the low molecular weight organosilicon compounds used according to the invention are $[(CH_3)_3SiO]_3SiOH$, $\{[(CH_3)_3SiO]_2Si(OH)\}_2O$ and $HO—[(CF_3CH_2CH_2)(CH_3)SiO]_3—H$.

The low molecular weight organosilicon compounds used according to the invention or the organosilicon compounds comprising units of the formula (I) used according to the invention can be prepared using procedures known in silicone chemistry, as described, for example, in D. Hoebbel et al., Z. anorg. allg. Chem. 424 (1976) 115 ff or using methods analogous to those described in the above-cited German patent application number 195 45 363.8.

The low molecular weight organosilicon compounds used according to the invention can be a single type or a mixture of at least two different types of such organosilicon compounds.

The compositions of the invention can be any previously known types of organopolysiloxane compositions which can be crosslinked to produce elastomers, for example one-component or two-component organopolysiloxane compositions which are vulcanizable at room temperature (RTV compositions) or elevated temperature (HTV compositions), where the crosslinking can occur by condensation, addition of Si-bonded hydrogen onto aliphatic multiple bonds or peroxidically by formation of free radicals. The crosslinkable organopolysiloxane compositions can be free of fillers but can also be filled with active or inactive fillers.

The type and amount of the components customarily used in such compositions are already known. For this purpose, reference may be made, for example, to DE-A 41 39 148 (Wacker-Chemie GmbH; issued on Jun. 3, 1993) and the corresponding U.S Pat. No. 5,268,441, German application DE-A 44 01 606 (Wacker-Chemie GmbH; filed on Jan. 20, 1994) and the corresponding US application having the serial number U.S. Ser. No. 08/368,183, German application DE-A 44 05 245 (Wacker-Chemie GmbH; filed on Feb. 18, 1994) and DE 43 36 345 A (Wacker-Chemie GmbH; issued on Apr. 27, 1995) and the corresponding US application having the serial number U.S. Ser. No. 08/326,903.

The compositions of the invention which are crosslinkable by condensation are preferably organopolysiloxane compositions which are storage-stable when water is excluded, are crosslinkable at room temperature to give elastomers when water is admitted and comprise (a) an organopolysiloxane having condensable groups,
(b) an organosilicon compound containing at least three Si-bonded hydrolyzable radicals,
(c) a condensation catalyst,
(d) a low molecular weight organosilicon compound having from 2 to 17 silicon atoms and comprising units of the formula (I) and, if desired, further materials.

The compositions of the invention which are crosslinkable by condensation can be one-component compositions or two-component compositions, where in the latter case one component does not simultaneously contain the constituents (a), (b) and (c).

As organopolysiloxane (a) having condensable groups, preference is given to using an organopolysiloxane of the formula $$HO(SiR_2O)_mSiR_2OH \quad (II)$$

where R are identical or different, substituted or unsubstituted monovalent hydrocarbon radicals having from 1 to 18 carbon atoms per radical and m is an integer having a value of at least 50.

Although not shown by formula (II), other siloxane units can be present in addition to the diorganosiloxane units $(SiR_2O)$. Examples of such other siloxane units, which are usually present only as impurities, are those of the formulae RSiO$_{3/2}$, R$_3$SiO$_{1/2}$ and SiO$_{4/2}$, where R is in each case as defined above. However, the amount of such siloxane units other than diorganosiloxane units is preferably not more than 10 mol %, in particular not more than 1 mol %, in each case based on the weight of the organopolysiloxanes (a).

The organopolysiloxanes (a) preferably have a viscosity of from 100 to 500,000 mm$^2$/s at 25° C.

Examples of radicals R are the examples given above for radicals R$^1$ and R$^2$ and also aliphatically unsaturated radicals such as the vinyl and allyl radicals; R is preferably a methyl or 3,3,3-trifluoropropyl radical, particularly preferably a methyl radical.

As organosilicon compounds containing at least three Si-bonded hydrolyzable groups (b), preference is given to using silanes of the formula

$$R_{4-n}SiZ_n \quad (III)$$

and/or their partial hydrolyzates having from 2 to 10 silicon atoms per molecule, where R can be identical or different and is as defined above, n is 3 or 4 and Z are identical or different hydrolyzable groups such as amino groups, amido groups, aminoxy groups, oximo groups such as —ON=C(CH$_3$)(C$_2$H$_5$), alkoxy groups such as methoxy and ethoxy groups, alkoxyalkoxy groups such as CH$_3$—O—C$_2$H$_5$—O—, alkenyloxy groups such as H$_2$C=(CH$_3$)CO—, or acyloxy groups such as the acetoxy group.

The hydrolyzable group Z is preferably an acetoxy group.

The organosilicon compound (b) is preferably used in an amount of from 2 to 10 parts by weight per 100 parts by weight of organopolysiloxane (a).

The condensation catalyst (c) is preferably a metal or organometallic compound, for example a salt of a carboxylic acid, an alkoxide or a halide of the metals Pb, Zn, Zr, Ti, Sb, Fe, Cd, Sn, Ba, Ca and Mn, e.g. tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate, trioctyltin acetate, titanium alkoxide or an organotitanium compound having at least one Si—O—Ti bond, or a catalyst as described in the above-cited DE-A 41 39 148.

The condensation catalyst (c) is preferably used in an amount of from 0.1 to 2 parts by weight per 100 parts by weight of organopolysiloxane (a).

The low molecular weight organosilicon compound comprising units of the formula (I) which is used according to the invention as component (d) is preferably [(CH$_3$)$_3$SiO]$_3$SiOH, {[(CH$_3$)$_3$SiO]$_2$SiOH}$_2$O and {[(CH$_3$)$_3$SiO]Si(OH)O}$_3$, with particular preference being given to [(CH$_3$)$_3$SiO]$_3$SiOH.

The low molecular weight organosilicon compound (d) used according to the invention is preferably employed in an amount of from 0.1 to 10 parts by weight per 100 parts by weight of organopolysiloxane (a).

Depending on the respective application, further materials (e) can be added to the organopolysiloxane compositions of the invention which can be vulcanized to give elastomers.

Examples of such further materials (e) are fillers such as inactive fillers, materials for improving the surface properties such as coupling agents, processing aids such as plasticizers, pigments, soluble dyes, fragrances, fungicides, purely organic resins, corrosion inhibitors, oxidation inhibitors, heat stabilizers, solvents, agents for influencing the electrical properties such as conductive carbon black, flame retardants, light stabilizers and agents for lengthening the skin formation time; component (e) preferably comprises fillers, plasticizers and coupling agents.

Examples of reinforcing fillers which can be used as further materials (e) are pyrogenic or precipitated silicas having BET surface areas of at least 50 m$^2$/g and also furnace black and acetylene black.

The silica fillers mentioned can have hydrophilic character or be hydrophobicized by known methods. On this subject, reference may be made, for example, to DE 38 39 900 A (Wacker-Chemie GmbH; filed on Nov. 25, 1988) and the corresponding U.S. Pat. No. 5,057,151. In general, the hydrophobicization is then carried out using from 1 to 20% by weight of hexamethyldisilazane and/or divinyltetramethyldisilazane and from 0.5 to 5% by weight of water, in each case based on the total weight of the organopolysiloxane composition; these reagents are advantageously added to the initially charged organopolysiloxane in a suitable mixer, e.g. a kneader or compounder, before the hydrophilic silica is gradually incorporated into the composition.

Examples of nonreinforcing fillers which can be used as further materials (e) are quartz flour, diatomaceous earth, calcium silicate, zirconium silicate, zeolites, metal oxide powders such as aluminum oxide, titanium oxide, iron oxide or zinc oxide, barium silicate, barium sulfate, calcium carbonate, gypsum and polymer powders such as polyacrylonitrile powder or polytetrafluoroethylene powder. Furthermore, fibrous components such as glass fibers and synthetic fibers can be used as fillers. The BET surface area of these fillers is preferably less than 50 m$^2$/g.

Examples of plasticizers which can be used as component (e) are trimethylsilyl-terminated or hydroxyl-terminated polydimethylsiloxanes having a viscosity of not more than 1000 mm$^2$/s at 25° C. or diphenylsilanediol.

Examples of coupling agents are aminosilanes such as aminoethylaminopropyltriethoxysilane or polysiloxanes containing aminoethylaminopropylsiloxy groups.

Examples of heat stabilizers are transition metal salts of fatty acids such as iron octoate, transition metal silanolates such as iron silanolate and cerium(IV) compounds.

Otherwise, the condensation-crosslinkable compositions of the invention preferably contain no further materials.

The individual components used in the compositions of the invention can in each case be one type of these components or a mixture of at least two types of these components.

The condensation-crosslinkable organopolysiloxane compositions of the invention can be prepared by known methods, for example by simple mixing of the individual components. The low molecular weight organosilicon compounds used according to the invention can be mixed in in various ways, e.g. in any step of the mixing of the individual components of the silicone rubber composition. Mixing is preferably carried out at room temperature and exposure to water is preferably avoided during mixing. If desired, however, this mixing can also be carried out at elevated temperatures, e.g. at a temperature in the range from 25 to 80° C.

If filler is used in the preparation of the condensation-crosslinkable compositions of the invention, the low molecular weight organosilicon compounds (d) are advantageously mixed into the composition during the incorporation of the filler. Another possibility is application of the low molecular weight organosilicon compound used according to the invention to the filler by mixing in a powder mixer or by mixing in a suspension of filler, inert organic solvent and low molecular weight organosilicon compound and subsequent removal of the organic solvent to dryness in order to subsequently incorporate the organosilicon compound together with the filler as support. A further possibility is to generate the low molecular weight organosilicon compound used according to the invention by chemical reaction on the filler and leave it on the latter.

To crosslink the compositions of the invention, the usual water content of the air is sufficient. Crosslinking can, if desired, also be carried out at temperatures higher than room temperature, e.g. at from 25 to 120° C., or at temperatures lower than room temperature, e.g. at from −10 to 25° C. Likewise, crosslinking can also be carried out at water concentrations which exceed the normal water content of the air.

The compositions of the invention are suitable as sealing compositions for joints, including vertical joints and similar empty spaces having internal widths of, for example, from 10 to 40 mm, for example of buildings, land vehicles, boats and aircraft, or as adhesives and putty compositions, e.g. in the construction of windows, or for producing protective coatings, including those for surfaces which are continually exposed to fresh or sea water, or for producing coatings which repel sticky materials, including those for substrates which come into contact with foods, for example packaging material which is intended for the storage and/or transport of sticky foods such as cakes, honey, sweets and meat, or for other applications in which the previously known compositions which crosslink at room temperature to give elastomers could be used, for example insulation of electrical or electronic devices.

The crosslinkable compositions of the invention comprising low molecular weight, fluorine-containing organosilicon compounds are particularly suitable for applications of rubbers which require mineral oil resistance and oleophobicity and have a high resistance to nonpolar organic liquid hydrocarbons such as aviation gasolines and fuels.

The addition-crosslinkable organopolysiloxane compositions of the invention preferably comprise (1) organopolysiloxanes having at least 18 silicon atoms and containing radicals having aliphatic carbon-carbon multiple bonds,
(2) organopolysiloxanes containing Si-bonded hydrogen atoms,
(3) a catalyst which promotes the addition of Si-bonded hydrogen onto aliphatic multiple bonds,
(4) at least one low molecular weight organosilicon compound having from 2 to 17 silicon atoms and comprising units of the formula (I) and
(5) reinforcing and/or nonreinforcing fillers and also, if desired, further materials.

If the composition of the invention is an addition-crosslinking two-component silicone rubber composition, the two components of the silicone rubber composition of the invention can contain all constituents in any combinations and ratios, with the proviso that one component does not simultaneously contain the constituents (1), (2) and (3).

The organopolysiloxanes (1) are preferably linear, cyclic or branched siloxanes having at least 18 silicon atoms and comprising units of the formula $$R^4_s R^5_t SiO_{(4-s-t)/2} \quad (IV)$$

where

R$^4$ can be identical or different and are each an SiC-bonded, aliphatically unsaturated hydrocarbon radical having from 2 to 18 carbon atoms, R$^5$ can be identical or different and are each a hydrogen atom or a substituted or unsubstituted, SiC-bonded aliphatically unsaturated hydrocarbon radical having from 1 to 18 carbon atoms, where a maximum of one radical R per silicon atom can be a hydrogen atom, s is 0, 1 or 2 and t is 0, 1, 2 or 3, with the proviso that the sum s+t is less than or equal to 3 and at least two radicals R$^4$ are present per siloxane molecule.

The organopolysiloxanes (1) preferably have an average viscosity of from $10^2$ to $10^6$ mm$^2$/s at 25° C.

The radical R$^4$ is preferably a hydrocarbon radical containing aliphatic multiple bonds and having from 2 to 6 carbon atoms, e.g. a vinyl, allyl, methallyl, 2-propenyl, 3-butenyl, 4-pentenyl, 5-hexenyl, butadienyl, hexadienyl, cyclopentenyl, cyclopentadienyl, cyclohexenyl, ethynyl, propargyl or 2-propynyl radical, particularly preferably a vinyl or allyl radical.

Examples of radicals R$^5$ are all the examples given for radicals R$^1$ and R$^2$.

The radical R$^5$ is preferably a substituted or unsubstituted, aliphatically saturated, monovalent hydrocarbon radical having from 1 to 8 carbon atoms, with particular preference being given to the methyl radical.

The organopolysiloxanes (1) are particularly preferably linear organopolysiloxanes having a viscosity of from 200 to $10^5$ mm$^2$/s at 25° C. and the structure $$(ViMe_2SiO_{1/2})(ViMeSiO)_{0-50}(Me_2SiO)_{30-2000}(ViMe_2SiO_{1/2})$$

where Me is a methyl radical and Vi is a vinyl radical.

As organopolysiloxanes (2) which contain Si-bonded hydrogen atoms, preference is given to using linear, cyclic or branched siloxanes comprising units of the formula $$R^5_u H_v SiO_{\frac{4-u-v}{2}} \quad (V)$$

where

R$^5$ can be identical or different and are as defined above, u is 0, 1, 2 or 3 and v is 0, 1 or 2, with the proviso that the sum of u+v is less than or equal to 3 and, on average, at least two Si-bonded hydrogen atoms are present per molecule.

The organopolysiloxanes (2) preferably have an average viscosity of from 10 to $2\times10^4$ mm$^2$/s at 25° C.

Preference is given to using a polyorganosiloxane (2) which contains three or more SiH bonds per molecule. When using a constituent (2) containing only two SiH bonds per molecule, the polyorganosiloxane (1) preferably has at least three aliphatic carbon-carbon multiple bonds per molecule.

Thus, the polyorganosiloxane (2) is preferably used as crosslinker. The hydrogen content of the crosslinker, based only on the hydrogen atoms bound directly to silicon atoms, is preferably in the range from 0.002 to 1.7% by weight of hydrogen, particularly preferably from 0.1 to 1.7% by weight of hydrogen.

The organopolysiloxanes (2) are particularly preferably organopolysiloxanes having a viscosity of from 20 to 1000 mm$^2$/s at 25° C.

The polyorganosiloxane (2) is preferably present in the curable silicone rubber composition in such an amount that the molar ratio of SiH groups to radicals having aliphatic carbon-carbon multiple bonds of the component (1) is from 0.5 to 5, preferably from 1.0 to 3.0.

Constituent (3) serves as catalyst for the addition reaction (hydrosilylation) between the radicals having aliphatic carbon-carbon multiple bonds of constituent (1) and the Si-bonded hydrogen atoms of constituent (2). Numerous suitable hydrosilylation catalysts have been described in the literature. In principle, all hydrosilylation catalysts customarily used in addition-crosslinking silicone rubber compositions can be employed in the compositions of the invention.

Hydrosilylation catalysts which can be used are metals such as platinum, rhodium, palladium, ruthenium and iridium, preferably platinum, which may, if desired, be fixed to finely divided support materials such as activated carbon, aluminum oxide or silicon dioxide.

Preference is given to using platinum and platinum compounds. Particular preference is given to using platinum compounds which are soluble in polyorganosiloxanes. Soluble platinum compounds which can be used are, for example, the platinum-olefin complexes of the formulae $(PtCl_2.olefin)_2$ and $H(PtCl_3.olefin)$, where the olefin is preferably an alkene having from 2 to 8 carbon atoms, e.g. ethylene, propylene, isomers of butene and octene, or a cycloalkene having from 5 to 7 carbon atoms, e.g. cyclopentene, cyclohexene and cycloheptene. Further soluble platinum catalysts are the platinum-cyclopropane complex of the formula $(PtCl_2.C_3H_6)_2$, the reaction products of hexachloroplatinic acids with alcohols, ethers and aldehydes or mixtures thereof or the reaction product of hexachloroplatinic acid with methylvinylcyclotetrasiloxane in the presence of sodium bicarbonate in ethanolic solution. Particular preference is given to complexes of platinum with vinylsiloxanes such as 1,3-divinyltetramethyldisiloxane.

The hydrosilylation catalyst can also be used in microencapsulated form, where the finely divided solid which encapsulates the catalyst and is insoluble in the polyorganosiloxane is, for example, a thermoplastic (polyester resin, silicone resin). The hydrosilylation catalyst can also be used in the form of an inclusion compound, for example in a cyclodextrin.

The amount of hydrosilylation catalyst used depends on the desired crosslinking rate and economic factors and is known. When using customary platinum catalysts, the amount present in the curable silicone rubber composition, based on elemental platinum, is preferably in the range from 0.1 to 500 ppm by weight, more preferably from 10 to 100 ppm by weight, of elemental platinum.

The low molecular weight organosilicon compound (4) used according to the invention is preferably $[(CH_3)_3SiO]_3SiOH$, $\{[(CH_3)_3SiO]_2SiOH\}_2O$ and $\{[(CH_3)_3SiO]Si(OH)O\}_3$, with particular preference being given to $[(CH_3)_3SiO]_3SiOH$.

The novel organopolysiloxane compositions which can be crosslinked to produce elastomers preferably contain from 0.01 to 10.0% by weight, particularly preferably from 0.1 to 5% by weight, of low molecular weight organosilicon compound (4), in each case based on the total weight of the organopolysiloxane composition.

Examples of fillers (5) used are the fillers mentioned above by way of example.

The novel organopolysiloxane compositions which can be crosslinked to produce elastomers preferably contain from 1 to 50 parts by weight, particularly preferably from 5 to 40 parts by weight, of filler, in each case based on 100 parts by weight of the crosslinkable organopolysiloxane composition of the invention.

While the constituents (1) to (5) are necessary constituents of the silicone rubber composition of the invention, it is possible, if desired, for further additives to be present in the silicone rubber composition in a proportion of up to 50% by weight, preferably from 1 to 40% by weight. These additives can be, for example, coupling agents such as aminoalkoxysilanes and linear or resinous methylsiloxanes containing Si-bonded hydrogen, heat stabilizers such as transition metal salts of fatty acids, e.g. iron octoate, transition metal silanolates such as iron silanolate, cerium(IV) compounds, silicas containing transition metals or palladium compounds, inhibitors, pigments, dyes and plasticizers.

Examples of plasticizers are the examples given above for plasticizers.

In particular, additives which enable the processing time and crosslinking rate of the curable silicone rubber composition to be set in a targeted way can be present. These inhibitors known per se are, for example, acetylenic alcohols such as ethynylcyclohexanol and 2-methyl-3-butyn-2-ol, trialkyl cyanurates, alkyl maleates such as diallyl maleate and dimethyl maleate, alkyl fumarates such as diethyl fumarate and diallyl fumarate, organic hydroperoxides such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes.

Otherwise, the compositions of the invention preferably contain no further materials.

The components used for preparing the compositions of the invention can in each case be a single type of such a component or a mixture of at least two different types of such a component.

The novel organopolysiloxane compositions which can be crosslinked by addition of Si-bonded hydrogen onto aliphatic carbon-carbon multiple bonds can be prepared by methods known per se, for example by simple mixing of the individual components. On this subject, reference may be made to the above-cited DE-A 44 05 245.

The low molecular weight organosilicon compounds used according to the invention can be mixed in in various ways, e.g. in any mixing step for the individual components of the silicone rubber composition. To prepare the addition-crosslinkable compositions of the invention, the low molecular weight organosilicon compounds are advantageously mixed into the composition during incorporation of the filler. Another possibility is application of the low molecular weight organosilicon compound to the filler by mixing in a powder mixer or by mixing in a suspension of filler, inert organic solvent and low molecular weight organosilicon compound used according to the invention and subsequent removal of the organic solvent to dryness in order to subsequently incorporate the organosilicon compound together with the filler as support. A further possibility is to generate the low molecular weight organosilicon compound used according to the invention by chemical reaction on the filler and to leave it on the latter.

When the compositions of the invention are prepared in two components, the low molecular weight organosilicon compound used according to the invention is preferably added in the last mixing step.

The addition-crosslinkable compositions of the invention can be allowed to crosslink under the same conditions as the previously known addition-crosslinkable compositions. Preferably, the vulcanization is carried out at a temperature of from 10 to 200° C.

The organopolysiloxane compositions of the invention and the elastomers prepared therefrom according to the invention can be used for all purposes for which organopolysiloxane compositions which can be crosslinked to produce elastomers or elastomers have also been used hitherto. The organopolysiloxane compositions of the invention and the elastomers prepared therefrom according to the invention are particularly suitable for shaped articles made by injection molding, molding applications which require improved tear propagation resistance, e.g. pacifiers for babies, nipples for babies' bottles, seals and special molds.

The crosslinkable compositions of the invention comprising low molecular weight, fluorine-containing organosilicon compounds are particularly suitable for applications of rubbers which require mineral oil resistance and oleophobicity and have a high resistance to nonpolar organic liquid hydrocarbons such as aviation gasolines and fuels.

The peroxidically crosslinkable organopolysiloxane compositions of the invention preferably comprise (A) organopolysiloxanes comprising units of the formula

(VI)

where

R$^6$ can be identical or different and are each a substituted or unsubstituted hydrocarbon radical and r is 0, 1, 2 or 3 and has an average numerical value of from 1.9 to 2.1, (B) reinforcing and/or nonreinforcing fillers, (C) an agent which effects crosslinking, for example an organic peroxide, (D) at least one low molecular weight organosilicon compound having from 2 to 17 silicon atoms and comprising units of the formula (I) and, if desired, (E) additives.

Examples of radicals R$^6$ are the examples given above for R, with preference being given to substituted or unsubstituted hydrocarbon radicals having from 1 to 8 carbon atoms, particularly preferably the methyl, vinyl, phenyl and 3,3,3-trifluoropropyl radicals.

Preferably, alkyl radicals, in particular methyl radicals, are bound to at least 70 mol % of the Si atoms present in the organopolysiloxane comprising units of the formula (VI). If the organopolysiloxanes (A) contain not only Si-bonded methyl and/or 3,3,3-trifluoropropyl radicals but also Si-bonded vinyl and/or phenyl radicals, the latter are preferably present in amounts of from 0.001 to 30 mol %.

The organopolysiloxanes (A) preferably consist predominantly of diorganosiloxane units. The end groups of the organopolysiloxanes (A) can be trialkylsiloxy groups, in particular trimethylsiloxy or dimethylvinylsiloxy radicals, but one or more of these alkyl groups can also be replaced by hydroxy groups or alkoxy groups such as methoxy or ethoxy radicals.

The organopolysiloxanes (A) can be liquids or highly viscous substances. The organopolysiloxanes (A) preferably have a viscosity at 25° C. of from $10^3$ to $10^8$ mm$^2$/s.

Examples of reinforcing and nonreinforcing fillers are the examples given above for fillers.

The novel organopolysiloxane compositions which can be crosslinked to produce elastomers preferably contain from 1 to 200 parts by weight, particularly preferably from 30 to 100 parts by weight, of filler (B), in each case based on 100 parts by weight of organopolysiloxane (A).

The component (C) can in general be an agent which initiates or effects crosslinking and has also been used hitherto in peroxidically crosslinkable compositions.

As component (C) in the organopolysiloxane compositions of the invention, preference is given to using peroxides such as dibenzoyl peroxide, bis(2,4-dichlorobenzoyl) peroxide, dicumyl peroxide and 2,5-bis(tert-butylperoxy)-2, 5-dimethylhexane and also mixtures thereof. Particular preference is given to bis(2,4-dichlorobenzoyl) peroxide and dicumyl peroxide.

The novel organopolysiloxane compositions which can be crosslinked to produce elastomers preferably contain from 0.4 to 2.0% by weight, particularly preferably from 0.7 to 1.5% by weight, of peroxide (C), in each case based on the total weight of the organopolysiloxane composition.

The low molecular weight organosilicon compound which is used as component (D) according to the invention and comprises units of the formula (I) is preferably [(CH$_3$)$_3$SiO]$_3$SiOH, {[(CH$_3$)$_3$SiO]$_2$SiOH}$_2$O and {[(CH$_3$)$_3$SiO]Si(OH)O}$_3$ and also [CF$_3$CH$_2$CH$_2$(CH$_3$)$_2$SiO]$_3$SiOH, {[CF$_3$CH$_2$CH$_2$(CH$_3$)$_2$SiO]$_2$SiOH}$_2$O, {[CF$_3$CH$_2$CH$_2$(CH$_3$)$_2$SiO]Si(OH)O}$_3$ and HO—[CF$_3$CH$_2$CH$_2$(CH$_3$)SiO]$_n$—H where n is from 3 to 15, with particular preference being given to [(CH$_3$)$_3$SiO]$_3$SiOH, [CF$_3$CH$_2$CH$_2$(CH$_3$)$_2$SiO]$_3$SiOH and HO—[CF$_3$CH$_2$CH$_2$(CH$_3$)SiO]$_n$—H where n is from 3 to 15.

The novel organopolysiloxane compositions which can be crosslinked to produce elastomers preferably contain from 0.005 to 30.0% by weight, particularly preferably from 0.1 to 10.0% by weight, of low molecular weight organosilicon compound (D), in each case based on the total weight of the organopolysiloxane composition.

Depending on the particular application, additives (E) such as processing aids, e.g. plasticizers, pigments and stabilizers, e.g. heat stabilizers, can be added to the organopolysiloxane compositions of the invention which can be vulcanized to form elastomers.

Examples of plasticizers and heat stabilizers are the examples of these which have been given above.

Otherwise, the compositions of the invention preferably contain no further materials.

The particular components used for preparing the compositions of the invention can in each case be a single type of such a component or a mixture of at least two different types of such a component.

The peroxidically crosslinkable organopolysiloxane oxane compositions of the invention can be prepared by known methods, for example by simple mixing of the individual components. The low molecular weight organosilicon compounds used according to the invention can be mixed in in various ways, e.g. in any step of the mixing of the individual components of the silicone rubber composition. To prepare the peroxidically crosslinkable compositions of the invention, the low molecular weight organosilicon compounds are advantageousley mixed into the composition during the incorporation of the filler. Another possibility is application of the low molecular weight organosilicon compound used according to the invention to the filler by mixing in a powder mixer or by mixing in a suspension of filler, inert organic solvent and low molecular weight organosilicon compound and subsequent removal of the organic solvent to dryness in order to subsequently incorporate the organosilicon compound together with the filler as support. A further possibility is to generate the low molecular weight organosilicon compound used according to the invention by chemical reaction on the filler and to leave it on the latter.

The peroxidically crosslinkable compositions of the invention can be allowed to crosslink under the same conditions as the peroxidically crosslinkable compositions known hitherto.

The organopolysiloxane compositions of the invention and the elastomers prepared therefrom according to the invention can be used for all purposes for which organopolysiloxane compositions which can be crosslinked to form elastomers or elastomers have also been used hitherto. The organopolysiloxane compositions of the invention and the elastomers prepared therefrom according to the invention are particularly suitable for applications which require improved tear propagation resistance, e.g. hoses, cable sheathing, motor vehicle components and seals.

The crosslinkable compositions of the invention which comprise low molecular weight fluorine-containing organosilicon compounds are particularly suitable for applications of rubbers which require mineral oil resistance and oleophobicity and have a high resistance to nonpolar organic liquid hydrocarbons such as aviation gasolines and fuels.

The crosslinkable compositions of the invention all have, regardless of the type of crosslinking, the advantage that they can be processed very readily and display very good Theological properties. The stability of the rheological properties on storage at both low and relatively high temperatures of from −60° C. to +80° C. is excellent, i.e. the stability of a set flow limit and viscosity over the storage time is significantly increased, so that stiffening of the uncrosslinked composition generally does not occur. Targeted addition of the low molecular weight organosilicon compounds used according to the invention enables these rheological properties, e.g. the flow limit, to be controlled to a defined degree.

The stickiness of the composition which frequently causes great problems, in particular during processing on roll mills, is suppressed and can be largely eliminated.

A further advantage of the compositions of the invention is that even small amounts of the low molecular weight organosilicon compounds used according to the invention are highly effective in terms of the abovementioned advantages.

In the examples described below, all viscosities are at a temperature of 25° C. Unless indicated otherwise, the following examples are carried out at the pressure of the surrounding atmosphere, i.e. at about 1000 hPa, and at room temperature, i.e. at about 20° C., or at the temperature which is established on combining the reactants at room temperature without additional heating or cooling. Furthermore, all parts and percentages are, unless indicated otherwise, by weight.

The following abbreviations are used in the examples:

Me: methyl radical

Vi: vinyl radical

EXAMPLE 1 i) Preparation of the Low Molecular Weight Organosilicon Compound $(Me_3SiO)_3SiOH$ A mixture of 1834 g of 1,3-hexamethyldisiloxane, 559 g of $SiCl_4$, 2.4 g (25 ppm) of tetramethylurea (2.5% strength in n-hexane) and 24 g of $PNCl_2$ (25% strength in trichloropropane) (=0.25% of $PNCl_2$) is stirred at room temperature for 46 hours. After taking off the volatile constituents at 30° C./400 hPa on a rotary evaporator, the residue is distilled. This gives 348 g of a colorless, clear liquid having a boiling point of 93–100° C. at 600 hPa. The composition of the product obtained is determined by means of the $^{29}$Si-NMR spectrum:

94 mol % of $(Me_3SiO)_3SiCl$ and 6 mol % of $(Me_3SiO)_4Si$.

The yield is 26%.

348 g of this mixture of 94 mol % of $(Me_3SiO)_3SiCl$ and 6 mol % of $(Me_3SiO)_4Si$ are then mixed with 105.7 g of triethylamine and 1670 g of n-hexane and, at room temperature, admixed with 84.9 g of water. The mixture is stirred at room temperature for 18 hours, subsequently heated under reflux for one hour, washed with water and the organic phase is dried over sodium sulfate. After taking off the volatile constituents at 30° C./700 hPa on a rotary evaporator, the residue is distilled via a packed column. This gives 267 g of a colorless, clear liquid having a boiling point of 73–75° C. at 500 hPa. The composition of the product obtained is determined by means of the $^{29}$Si-NMR spectrum:

96 mol % of $(Me_3SiO)_3SiOH$ and 4 mol % of $(Me_3SiO)_4Si$.

Preparation of a Base Composition for Addition-crosslinking Compositions 500 g of a vinyl-terminated dimethylpolysiloxane having a viscosity of 20,000 mm$^2$/s are placed in a 5 l laboratory kneader, heated to 150° C. and admixed with 390 g of a silica hydrophobicized with hexamethyldisilazane as described in the abovementioned DE 38 39 900 A as filler. Volatile constituents are removed by kneading at 1000 hPa and 150° C. for one hour. This gives a very stiff mass which is subsequently diluted with 410 g of the abovementioned dimethylpolysiloxane. An A component and a B component are subsequently prepared from this base composition in a planetary mixer.

To prepare the A component, 380 g of the above-described base composition, 0.2 g of Pt-divinyltetramethyldisiloxane complex, 1.0 g of the low molecular weight organosilicon compound prepared above under i) and 1.0 g of ethynylcyclohexanol as inhibitor are mixed for 30 minutes at room temperature and atmospheric pressure.

To prepare the B component, 380 g of the above-described base composition, 18 g of linear methyl-H-polysiloxane containing 0.5 mol % of Si—H and having a viscosity of 400 mm$^2$/s as crosslinker, 1.0 g of ethynylcyclohexanol as inhibitor and 1.0 g of the organosilicon compound prepared above under i) are then mixed for 30 minutes at room temperature and atmospheric pressure.

The components A and B are mixed in a weight ratio of 1:1 and allowed to crosslink at a temperature of 160° C.; the pot life and the storage stability are determined as follows:

Pot Life (Rapid Test)

The flow behavior of the composition after the storage time is characterized by means of the measurement described below.

One drop of 0.6 g of the composition to be examined is applied in the middle of a transparent Hostaphane® film (PETP; commercially available from Kalle/Hoechst, Germany). For subsequent evaluation, this transparent Hostaphan film is located on graph paper. A second Hostaphan film is laid on top of the drop of composition and the drop of composition is subsequently loaded using a 30 mm diameter disk and a weight of 500 g. The drop of composition is pressed into a flat disk. The maximum and minimum diameter of the disk are measured and the mean is formed: pot life-0 [mm]. In addition, the pot life of a further drop of composition which has been stored for 30 minutes at 70° C. is determined analogously, pot life-70° [mm]. The value of the pot life is reported as the difference:

Pot life [mm]=pot life-0 [mm] minus pot life-70° [mm].

The test can be carried out on the A or B component. The values given in Table 1 refer to the more sensitive B component.

Storage Stability

The storage stability of the viscosity is determined as follows. The flow curve of the composition is recorded using a cone-and-plate system (diameter 30 mm, cone spacing 50 μm) (Rheolab MC 100, from Physica, Stuttgart) at a shear rate from 0 to 1 1/sec; the value at a shear rate of 0.81 1/sec is recorded: visc.-0. In addition, the viscosity after storage at 150° C./16 hours is measured analogously: visc.-150°. The value reported is the relative change in the viscosity caused by storage at 150° C./16 hours:

Storage stability [%]=[(visc.-150° C.–visc.-0) divided by visc.-0] multiplied by 100.

The results are shown in Table 1.

EXAMPLE 2 ii) Preparation of the Low Molecular Weight Organosilicon Compound $(Me_3SiO)_3SiOH$ 50 g of water and 50 g of hexamethyldisilazane are intensively mixed with 100 g of a pyrogenic silica having a specific surface area determined by the BET method of 300 m$^2$/g (commercially available from Wacker-Chemie GmbH under the name "WACKER HDK$^R$" T30), stirred for one hour and subsequently stored at 80° C. for 24 hours. The pulverulent reaction mixture is subsequently freed of volatile compounds at 140° C. for 2 hours in a gentle stream of nitrogen. Distillation in dry nitrogen at 220° C. for 8 hours gives, after separating off a small amount of an aqueous phase, 17 g of a clear liquid which, according to gas chromatography, contains 83% of $(Me_3SiO)_3SiOH$.

The low molecular weight organosilicon compound obtained as described in ii) is processed and tested as described in Example 1.

Values for the pot life and the storage stability are given in Table 1.

EXAMPLE 3 iii) Preparation of the Low Molecular Weight Organosilicon Compound $(Me_3SiO)_3SiOH$ 50 g of water and 50 g of hexamethyldisilazane and 100 g of a pyrogenic silica having a specific surface area determined by the BET method of 300 m$^2$/g (commercially available from Wacker-Chemie GmbH under the name "WACKER HDK$^R$ T30") are suspended under shear in 500 g of hexamethyldisiloxane and subsequently reacted at 80° C. for 24 hours while stirring. Excess hexamethyldisiloxane is subsequently distilled off at atmospheric pressure to 120° C. The pulverulent reaction mixture obtained in this way is subsequently dried at 140° C. for 2 hours in a gentle stream of nitrogen. Distillation in dry nitrogen at 220° C. for 8 hours gives, after separating off the aqueous phase, 15 g of a clear liquid which, according to gas chromatography, contains 82% of $(Me_3SiO)_3SiOH$.

The low molecular weight organosilicon compound obtained as described in iii) is processed and tested as described in Example 1.

Values for the pot life and the storage stability are given in Table 1.

TABLE 1

| Example | Pot life (mm) | Storage stability (%) |
| --- | --- | --- |
| 1 | 3 | 45 |
| 2 | 3 | 50 |
| 3 | 3 | 50 |
| C1 | 5 | 170 |

Comparative Example 1

An addition-crosslinking composition is prepared by a procedure analogous to that described in Example 1 except that no low molecular weight compound $(Me_3SiO)_3SiOH$ is used.

Values for the pot life and the storage stability are given in Table 1.

EXAMPLE 4 iv) Preparation of the Low Molecular Weight Organosilicon Compound $[CF_3CH_2CH_2(CH_3)_2SiO]_3SiOH$ A mixture of 3620 g of 1,3-bis(3,3,3-trifluoropropyl)-1,1,3,3-tetramethyldisiloxane, 559 g of $SiCl_4$, 2.4 g (25 ppm) of tetramethylurea (2.5% strength in n-hexane) and 24 g of $PNCl_2$ (25% strength in trichloropropane) (=0.25% of $PNCl_2$) is stirred at room temperature for 46 hours. After taking off the volatile constituents at 30° C./100 hPa on a rotary evaporator, the residue is distilled. This gives 654 g of a colorless, clear liquid having a boiling point of 87–96° C. at 50 hPa. The composition of the product obtained is determined by means of the $^{29}$Si-NMR spectrum:

87 mol % of $[CF_3CH_2CH_2(CH_3)_2SiO]_3SiCl$ and 13 mol % of $[CF_3CH_2CH_2(CH_3)_2SiO]_4Si$ 654 g of this mixture of 87 mol % of $[CF_3CH_2CH_2(CH_3)_2SiO]_3SiCl$ and 13 mol % of $[CF_3CH_2CH_2(CH_3)_2SiO]_4Si$ are then mixed with 105.7 g of triethylamine and 1670 g of n-hexane and admixed at room temperature with 84.9 g of water. The mixture is stirred at room temperature for 18 hours, subsequently heated under reflux for one hour, washed with water and the organic phase is dried over sodium sulfate. After taking off the volatile constituents at 30° C./100 hPa on a rotary evaporator, the residue is distilled via a packed column. This gives 507 g of a colorless, clear liquid having a boiling range of 67–760° C. at 40 hPa. The composition of the product obtained is determined by means of the $^{29}$Si-NMR spectrum:

87 mol % of $[CF_3CH_2CH_2(CH_3)_2SiO]_3SiOH$ and 13 mol % of $[CF_3CH_2CH_2(CH_3)_2SiO]_4Si$ Preparation of a Peroxidically Crosslinkable Base Composition for Fluorosilicone Rubber 244 g of a vinyldimethyl-terminated poly(3,3,3-trifluoropropylmethylsiloxane) having a Brabender viscosity of 550 N/m, 2.5 g of a trimethylsilyl-terminated poly(3,3,3-trifluoropropylmethylsiloxane) containing 20 mol % of (ViMeSiO) units and having a viscosity of 1000 mm$^2$/s, 0.4 g of 1,3-divinyltetramethyldisilazane and 62 g of a silica surface-modified with bis(3,3,3-trifluoropropyl) tetramethyldisilazane are mixed in a kneader for 30 minutes. After heating to 150° C. over a period of 2 hours, 1.2 g of the low molecular weight organosilicon compound prepared above under iv) are added, the mixture is kneaded for 45 minutes and cooled. The processability, i.e. no stickiness, is subsequently tested on a roll mill.

Processability, i.e. Test for Freedom from Stickiness 60 g of the composition are sheeted out on a two-roll mill and subsequently rolled up into a "dolly", the latter by hand. This dolly is subsequently again sheeted out. This procedure is repeated a number of times. The figure determined is the number of times that this procedure can be repeated without the composition remaining stuck to the roll and hindering further processing:

Number of dollies=measure of processability without stickiness.

The results are shown in Table 2.

EXAMPLE 5

A peroxidically crosslinkable base composition for fluorosilicone rubber is prepared by a procedure analogous to that described in Example 4, but without preparation of $[CF_3CH_2CH_2(CH_3)_2SiO]_3SiOH$; in place of $[CF_3CH_2CH_2(CH_3)_2SiO]_3SiOH$, the low molecular organosilicon compound HO—[CF$_3$CH$_2$CH$_2$(CH$_3$)SiO]$_x$H having a viscosity of 10 mm$^2$/s is added to the composition.

Values for the processability and stickiness are given in Table 2.

TABLE 2

| Example | Processability (number of dollies without stickiness) |
|---------|-------------------------------------------------------|
| 4       | 19 |
| 5       | 20 |
| C2      | 1  |

Comparative Example 2

A peroxidically crosslinkable base composition for fluorosilicone rubber is prepared by a procedure analogous to that described in Example 4, but without the preparation of [(CF$_3$CH$_2$CH$_2$)(CH$_3$)$_2$SiO]$_3$SiOH and without incorporation of [(CF$_3$CH$_2$CH$_2$)(CH$_3$)$_2$SiO]$_3$SiOH into the HTV composition.

Values for the processability and stickiness are given in Table 2.

EXAMPLE 6

Preparation of a Base Composition for a Condensation-crosslinking RTV-I Composition In a laboratory mixer with exclusion of moisture, 30 g of low molecular weight compound (Me$_3$SiO)$_3$SiOH whose preparation is described in Example 1 under i), 680 g of a hydrophobic silica prepared as described in DE-A 38 39 900 (Wacker-Chemie GmbH, Schuster et al) and additionally 15 g of n-propanol as plasticizer and 154 g of tetraacetoxysilane as crosslinker and 1.5 g of dibutyltin diacetate as crosslinking catalyst are added to a mixture of 2000 g of a polydimethylsiloxane having OH groups at both ends and a viscosity of 20,000 mm$^2$/s and 400 g of a poly-dimethylsiloxane having OH groups at both ends and a viscosity of 80,000 mm$^2$/s.

The pseudoplasticity and flow limit of the resulting composition is determined. Here, 5 g of the composition are applied in the middle of a transparent Hostaphan film. For subsequent evaluation, this transparent Hostaphan film is located on graph paper. During the crosslinking time, the composition flows apart before crosslinking if the flow limit is insufficient. The figure measured is the mean diameter of the area over which the composition spreads: D [cm]

The result is shown in Table 3.

TABLE 3

| Example | Flow limit [cm] |
|---------|-----------------|
| 6       | 2   |
| C3      | 5.5 |

Comparative Example 3

A condensation-crosslinkable base composition is prepared by a procedure analogous to that described in Example 6, but without incorporation of (Me$_3$SiO)$_3$SiOH.

The flow limit is given in table 3.

What is claimed is:

1. A one-component or two-component crosslinkable, organopolysiloxane-based composition which comprises, in addition to organopolysiloxanes, at least one low molecular weight organosilicon compound having from 2 to 17 silicon atoms and comprising units of the formula $$R^1{}_aR^2{}_b(OR^3)_cSiO_{4-(a+b+c)/2} \quad (I)$$

where
R$^1$ can be identical or different and are each an aliphatically saturated, SiC-bonded hydrocarbon radical having from 1 to 18 carbon atoms,
R$^2$ can be identical or different and are each an aliphatically saturated, halogen-substituted SiC-bonded hydrocarbon radical having from 1 to 18 carbon atoms,
R$^3$ are each a hydrogen atom,
a is 0, 1, 2 or 3,
b is 0, 1, 2 or 3,
c is 0, 1, 2 or 3 and
the sum of a, b and c in formula (I) is less than or equal to 3, with the proviso that low molecular weight organosilicon compounds comprising units of the formula (I) where b=0 contain at least one unit of the formula (I) in which a is 0 or 1 and at least one unit of the formula (I) in which a is 3
said low molecular weight organosilicon compound present in at least one component in an amount of from 0.1 to 5% by weight, based on the total weight of the crosslinkable composition, said amount being effective to (a) increase the pot life of the crosslinkable components following their admixture, (b) to increase the storage stability of any single component containing said low molecular weight organosilicon compound, and/or (c) to decrease the tack of said crosslinkable, organopolysiloxane-based composition prior to cure, wherein said composition is storage-stable when water is excluded, is crosslinkable at room temperature to give elastomers when water is admitted and comprises
(a) an organopolysiloxane having condensable groups,
(b) an organosilicon compound containing at least three Si-bonded hydrolyzable radicals,
(c) a condensation catalyst,
(d) a low molecular weight organosilicon compound having from 2 to 17 silicon atoms and comprising units of the formula (I) in amounts of from 0.1 to 5 % by weight, based on the total weight of the crosslinkable composition, and, if desired, further materials.

2. A one-component or two-component crosslinkable, organopolysiloxane-based composition which comprises, in addition to organopolysiloxanes, at least one low molecular weight organosilicon compound having from 2 to 17 silicon atoms and comprising units of the formula $$R^1{}_aR^2{}_b(OR^3)_cSiO_{4-(a+b+c)/2} \quad (I)$$

where
R$^1$ can be identical or different and are each an aliphatically saturated, SiC-bonded hydrocarbon radical having from 1 to 18 carbon atoms,
R$^2$ can be identical or different and are each an aliphatically saturated, halogen-substituted SiC-bonded hydrocarbon radical having from 1 to 18 carbon atoms,
R$^3$ are each a hydrogen atom,
a is 0, 1, 2 or 3,
b is 0, 1, 2 or 3,
c is 0, 1, 2 or 3 and
the sum of a, b and c in formula (I) is less than or equal to 3, with the proviso that low molecular weight organosilicon compounds comprising units of the formula (I) where b=0 contain at least one unit of the formula (I) in which a is 0 or 1 and at least one unit of the formula (I) in which a is 3 said low molecular weight organosilicon compound present in at least one component in an amount of from 0.1 to 5% by weight, based on the total weight of the crosslinkable composition, said amount being effective to (a) increase the pot life of the crosslinkable components following their admixture, (b) to increase the storage stability of any single component containing said low molecular weight organosilicon compound, and/or (c) to decrease the tack of said crosslinkable, organopolysiloxane-based composition prior to cure, and wherein there are no fluorocarbons present in $R^1$ and $R^2$.

3. A one-component or two-component crosslinkable, organopolysiloxane-based composition which comprises, in addition to organopolysiloxanes, at least one low molecular weight organosilicon compound having from 2 to 17 silicon atoms and comprising units of the formula $$R^1{}_aR^2{}_b(OR^3)_cSiO_{4-(a+b+c)/2} \qquad (I)$$

where
- $R^1$ can be identical or different and are each an aliphatically saturated, SiC-bonded hydrocarbon radical having from 1 to 18 carbon atoms,
- $R^2$ can be identical or different and are each an aliphatically saturated, halogen-substituted SiC-bonded hydrocarbon radical having from 1 to 18 carbon atoms,
- $R^3$ are each a hydrogen atom,
- a is 0, 1, 2 or 3,
- b is 0, 1, 2 or 3,
- c is 0, 1, 2 or 3 and the sum of a, b and c in formula (I) is less than or equal to 3, with the proviso that low molecular weight organosilicon compounds comprising units of the formula (I) where b=0 contain at least one unit of the formula (I) in which a is 0 or 1 and at least one unit of the formula (I) in which a is 3, the amount of low molecular weight organosilicon compound being effective to (a) increase the pot life of the crosslinkable components following their admixture, (b) to increase the storage stability of any single component containing said low molecular weight organosilicon compound, and/or (c) to decrease the tack of said crosslinkable, organopolysiloxane-based composition prior to cure, no single component containing more than 1.2 weight percent of said low molecular weight organosilicon compound, and wherein there are no fluorocarbons present in $R^1$ and $R^2$.

4. A one-component or two-component crosslinkable, organopolysiloxane-based composition which comprises, in addition to organopolysiloxanes, at least one low molecular weight organosilicon compound having from 2 to 17 silicon atoms and comprising units of the formula $$R^1{}_aR^2{}_b(OR^3)_cSiO_{4-(a+b+c)/2} \qquad (I)$$

where
- $R^1$ can be identical or different and are each an aliphatically saturated, SiC-bonded hydrocarbon radical having from 1 to 18 carbon atoms,
- $R^2$ can be identical or different and are each an aliphatically saturated, halogen-substituted SiC-bonded hydrocarbon radical having from 1 to 18 carbon atoms,
- $R^3$ are each a hydrogen atom,
- a is 0, 1, 2 or 3,
- b is 0, 1, 2 or 3,
- c is 0, 1, 2 or 3 and the sum of a, b and c in formula (I) is less than or equal to 3, with the proviso that low molecular weight organosilicon compounds comprising units of the formula (I) where b=0 contain at least one unit of the formula (I) in which a is 0 or 1 and at least one unit of the formula (I) in which a is 3 said low molecular weight organosilicon compound being present in at least one component in an amount of from 0.1 to 5 % by weight, based on the total weight of the crosslinkable composition, said amount being effective to (a) increase the pot life of the crosslinkable components following their admixture, (b) to increase the storage stability of any single component containing said low molecular weight organosilicon compound, and/or (c) to decrease the tack of said crosslinkable, organopolysiloxane-based composition prior to cure;

said composition being storage-stable when water is excluded, and being crosslinkable at room temperature to give elastomers when water is admitted and comprising (a) an organopolysiloxane having condensable groups, (b) an organosilicon compound containing at least three Si-bonded hydrolyzable radicals, (c) a condensation catalyst, (d) a low molecular weight organosilicon compound having from 2 to 17 silicon atoms and comprising units of the formula (I) and, if desired, further materials;

wherein component (d) is $[(CH_3)_3SiO]_3SiOH$, $\{[(CH_3)_3SiO]_2SiOH\}_2O$ and $\{[(CH_3)_3SiO]Si(OH)O\}_3$.

* * * * *